United States Patent [19]
Hill et al.

[11] Patent Number: 5,876,537
[45] Date of Patent: Mar. 2, 1999

[54] METHOD OF MAKING A CONTINUOUS CERAMIC FIBER COMPOSITE HOT GAS FILTER

[75] Inventors: Charles A. Hill; Richard A. Wagner; Ronald G. Komoroski; Greg A. Gunter; Eric A. Barringer; Richard W. Goettler, all of Lynchburg, Va.

[73] Assignee: McDermott Technology, Inc., New Orleans, La.

[21] Appl. No.: 788,717

[22] Filed: Jan. 23, 1997

[51] Int. Cl.$^6$ ............................. B32B 31/26; B01D 39/20
[52] U.S. Cl. ..................................... 156/89.11; 156/89.25; 156/173; 156/174; 156/250; 55/523; 55/524; 55/527; 210/509
[58] Field of Search ............................. 156/89, 169, 173, 156/174, 175, 250, 89.11, 89.25; 210/504, 505, 508, 509; 55/523, 524, 527

[56] References Cited

U.S. PATENT DOCUMENTS

| | | | |
|---|---|---|---|
| 1,514,283 | 11/1924 | Haste . | |
| 3,285,793 | 11/1966 | Chavannes | 156/210 |
| 4,092,194 | 5/1978 | Green | 156/89 |
| 4,343,717 | 8/1982 | Lok . | |
| 4,735,849 | 4/1988 | Murakami et al. | 428/224 |

(List continued on next page.)

OTHER PUBLICATIONS

Whitney, S. & Weitzel, P. Technical Paper entitled "Integrating Gasification with PFBC", pp. 1–12. Preprint of the paper presented at the 1993 International Joint Power Generation Conference, Kansas City, MO, sponsored by ASME, Oct. 17–22, 1993; published in ASME journal FACT vol. 16, *FBC and AFBC Projects and Technology*, at pp. 21–32, ©1993 ASME, Boyd & Mahr, Editors.

The Babcock & Wilcox Company brochure #E101–3117A 3M H Sep. 1993, entitled "PFBC A 21st Century Technology for Today". ©Copyright 1993.

The Babcock & Wilcox Company Product Sheet #PS 294A 1M M Jul. 1990, entitled "Babcock & Wilcox Advanced Ceramic Tube Filter (ACTF)". ©Copyright 1990.

Eggerstedt, P.M., "IF&P Fibrosic Filters", Proceedings of the Coal–Fired Power Systems 94, U.S. Department of Energy, Morgantown Energy Technology Center, pp. 166–175, Jun. 1994.

Chiou, Jeng–Maw & Chung, D.D.L., "Improvement of the temperature resistance of aluminum–matrix composites using an acid phosphate binder—Part 1—Binders", *Journal of Materials Science*, 28, pp. 1435–1446, ©1993, Chapman & Hall.

Cicero, D.C., Dennis, R.A., Geiling, D.W. & Schmidt, D.K., "Hot–gas cleanup for coal–based gas turbines", *Mechanical Engineering*, Sep. 1994, pp. 70–75.

*Primary Examiner*—Curtis Mayes
*Attorney, Agent, or Firm*—Robert J. Edwards; Eric Marich

[57] ABSTRACT

A ceramic fiber composite structure particularly suitable for use as a hot gas cleanup ceramic fiber composite filter and method of making same from ceramic composite material has a structure which provides for increased strength and toughness in high temperature environments. The ceramic fiber composite structure or filter is made by a process in which a continuous ceramic fiber is intimately surrounded by discontinuous chopped ceramic fibers during manufacture to produce a ceramic fiber composite preform which is then bonded using various ceramic binders. The ceramic fiber composite preform is then fired to create a bond phase at the fiber contact points. Parameters such as fiber tension, spacing, and the relative proportions of the continuous ceramic fiber and chopped ceramic fibers can be varied as the continuous ceramic fiber and chopped ceramic fiber are simultaneously formed on the porous vacuum mandrel to obtain a desired distribution of the continuous ceramic fiber and the chopped ceramic fiber in the ceramic fiber composite structure or filter.

36 Claims, 3 Drawing Sheets

U.S. PATENT DOCUMENTS

| | | | |
|---|---|---|---|
| 4,752,515 | 6/1988 | Hosoi et al. | 428/114 |
| 4,894,070 | 1/1990 | Keidel et al. | 55/523 X |
| 4,976,761 | 12/1990 | Allaire | 156/89 X |
| 5,075,160 | 12/1991 | Stinton et al. | 428/282 |
| 5,102,601 | 4/1992 | Farris et al. | 264/183 |
| 5,196,120 | 3/1993 | White | 210/504 |
| 5,264,261 | 11/1993 | Bush | 428/36.4 |
| 5,273,818 | 12/1993 | Kim et al. | 428/288 |
| 5,294,387 | 3/1994 | Nakano et al. | 156/89 |
| 5,366,792 | 11/1994 | Shirayanagi et al. | 428/196 |
| 5,397,630 | 3/1995 | Kim et al. | 428/192 |
| 5,405,682 | 4/1995 | Shawyer et al. | 428/221 |
| 5,407,734 | 4/1995 | Singh et al. | 428/224 |
| 5,418,045 | 5/1995 | Pike et al. | 428/198 |
| 5,453,108 | 9/1995 | Isaksson et al. | 55/523 X |
| 5,456,983 | 10/1995 | Sassa | 428/370 |
| 5,474,586 | 12/1995 | Eaton et al. | 55/523 X |
| 5,482,537 | 1/1996 | Eriksson | 55/523 X |
| 5,536,285 | 7/1996 | Isaksson et al. | 55/523 X |
| 5,569,343 | 10/1996 | Garrigus | 156/175 X |
| 5,639,337 | 6/1997 | Darrieux et al. | 156/169 X |
| 5,688,347 | 11/1997 | Connolly et al. | 156/89 |
| 5,780,126 | 7/1998 | Smith et al. | 55/523 X |

METHOD OF MAKING A CONTINUOUS CERAMIC FIBER COMPOSITE HOT GAS FILTER

FIELD AND BACKGROUND OF THE INVENTION

The present invention relates in general to a new and useful ceramic fiber composite structure and a method of making same and, in particular, to a ceramic fiber composite filter useful for hot gas cleanup applications which employs a distribution of continuous ceramic fiber and chopped ceramic fibers throughout the filter which results in a unique, lightweight construction having improved strength and toughness.

Furnace exhaust gases resulting from the combustion of fossil fuels typically contain many impurities. Filters have been used to reduce or eliminate the impurities in such furnace exhaust gases. However, there is an increased need for improved filters which are capable of withstanding higher temperatures and pressures for removing particulates from hot combustion gases.

Advanced coal-fired power generation systems such as integrated gasification combined cycle (IGCC) or pressurized fluid bed combustor (PFBC) based systems rely on hot gas filtration equipment to meet turbine inlet gas stream requirements and clean air requirements. In the case of the pressurized fluidized bed combustor (PFBC), the combustion gas stream is provided at a temperature of approximately 1600° F. (871° C.) and it contains both coal ash and fluidized bed material.

In order to maintain system efficiency, it is necessary that the filter system operate at or close to the combustion temperature. Both metal and ceramic tubular or candle (closed-end tube) filters are used to separate the particulates from the gas stream at elevated temperature. Tube filters and candle filters both utilize rigid ceramic filter elements. In tube filter systems, the ceramic filter element is mounted between tube sheets and the gas flows from the inside to the outside of the element. In candle filter systems, the dirty gas is on the outside of the filter element and clean gas flows into the inside of the element. Ash accumulations on the filter surface are removed by back-pulsing with high pressure gas applied in the reverse flow direction at regular intervals ranging from a few minutes to a few hours. Since the back-pulse gas may be at ambient temperature or only slightly pre-heated, the back-pulse process subjects the filter material to a significant thermal transient condition. In addition, unpredictable system upsets, such as combustor or turbine trips, may result in even more severe thermal transients. Filter failures have been attributed to the accumulation of damage caused by these types of thermal transients. Finally, the hot gas filters must also be resistant to the corrosive effects of any alkali, sulfur, and steam components contained within the hot combustion gas stream.

The ceramic filter elements are typically made of a dense, coarse-grained refractory material, such as Cordierite or silicon carbide, and bonded with a second phase. The bond phase may be crystalline or glassy and it is critical to the strength and corrosion resistance of the filter. The open porosity of such monolithic filter materials is approximately 40 percent. The bend strength of monolithic filter materials is in the range of 1 to 4 ksi (ksi=1000 lbs-per square inch). The fracture behavior is brittle which typically results in catastrophic failure of the filter element.

Various ceramic fiber-based filter elements are under development. These include vacuum formed chopped ceramic fiber filters, chemical vapor infiltration (CVI) bonded ceramic fiber filters, and sol-gel bonded continuous ceramic fiber filter elements. One type of filter is produced by vacuum forming chopped or discontinuous ceramic fiber on a mandrel using standard non-woven or felt production methods. The vacuum formed chopped ceramic fiber preforms are impregnated with aluminum oxide and/or silicon dioxide colloidal solutions and heat treated to develop a bond at the fiber contact points. The resulting filter element exhibits bend strengths in the range of 200 to 500 psi (pounds per square inch). Higher strength is required to meet the thermal and mechanical demands of this application. The filters composed of continuous ceramic fibers bonded by chemical vapor infiltration silicon carbide exhibit acceptable strength, but may not be chemically stable in the oxidizing or other corrosive environments of a pressurized fluidized bed combustion system.

A similar type of high temperature ceramic composite filter is disclosed in U.S. Pat. No. 5,196,120 to White. The ceramic fiber filter is useful in filtering gases at elevated temperatures, such as those from a furnace, and the filter is composed of ceramic fibers coated with an intermediate carbonaceous layer and an outer coating of silicon carbide using chemical vapor deposition. In one embodiment, the filter has a rigid preform base of continuous ceramic fiber strands. Discontinuous fibers may be applied as an optional step following production of the preform, by immersing the preform in a slurry tank and creating a vacuum inside the preform to attract the discontinuous fibers (see Col. 3, line 52 to Col. 4, line 5). White thus teaches that a vacuum wound preform coated with a slurry of chopped fiber is known. Instead, the preform and discontinuous fibers are treated with phenolic resin, and then heated in successive steps to cure and bind the fibers together. Further, White also indicates that winding of the preform and the coating with chopped fiber slurry are two distinct steps, rather than one simultaneous, continuous step. The resulting preform is therefore comprised of separate layers of continuous fibers and chopped fibers.

Singh et al. (U.S. Pat. No. 5,407,734) teaches a ceramic fiber composite laminated tape. The tape is composed of a layer of fibrous material, with spaces between the fibers, which is coated with a slurry of ceramic fiber whiskers and organic binding material. Several tapes are then combined and laminated to form the composite tape. The laminated tape is then heated to drive off the organic binding material and hot pressed to form the composite. Singh et al. discloses the use of silicon and aluminum compounds for making the ceramic fiber. Singh et al. also discusses prior slurry coating techniques and bonding techniques. In col. 1, lines 16–35 of Singh et al. states that passing a filament through slurry does not attract enough matrix components, and that chemical vapor deposition methods of binding the materials is too slow.

Farris et al. (U.S. Pat. No. 5,102,601) teaches fabricating a composite by extruding a viscous fiber and passing the fiber through a water bath to cause coagulation of the fiber material before winding it on a take-up roll. This teaching of this patent is distinct from the present invention in that it does not coat a fiber with slurry in the tank, but is instead using the tank to cure the fiber material.

Stinton et al. (U.S. Pat. No. 5,075,160) discloses a filter for removing particulate matter from high temperature flowing fluids, particularly gases, that is reinforced with ceramic fibers and coated with a thin layer of a protective and bonding refractory applied by chemical vapor deposition (CVD) techniques. A thin and extended layer of a ceramic felt, paper, etc. forms the preform which is coated with the ceramic, and is advantageously silicon carbide (SiC).

The use of chemical binders with some ceramic fiber and metal composites is disclosed in an article by Jeng-Maw Chiou and D.D.L. Chung, entitled, "Improvement of the temperature resistance of aluminum-matrix composites using an acid phosphate binder—Part 1—Binders", appearing in the *Journal of Materials Science* 28, p.1435–1446, © 1993 Chapman & Hall. The article discusses various binder compositions, such as silica and phosphate binders, and their uses in forming ceramic-metal matrix compositions.

Eggarstedt, of Industrial Filter & Pump Mfg. Co., Inc. discusses work performed under DOE contract DE-FG02-92ER81349 from Jul. 22, 1992 to Feb. 17, 1995 in a paper entitled "IF&P Fibrosic™ Filters". The paper discloses formation of ceramic filter elements using vacuum formed chopped ceramic fiber. However Eggarstedt does not disclose any simultaneous application or use of continuous ceramic fibers in addition to the chopped fiber, in contrast to the present invention.

There remains a critical need to develop a more rugged hot gas filter tube material in order to improve the reliability of the aforementioned advanced energy systems.

SUMMARY OF THE INVENTION

It is a primary object of the present invention to provide a ceramic fiber composite filter which exhibits improved strength and toughness, is lightweight, and is economical to produce. The composite filter is particularly suitable for use in combustion gas cleanup applications. The vacuum winding fabrication method of the present invention utilizes continuous ceramic fiber reinforcement of a vacuum formed discontinuous or chopped ceramic fiber matrix. Basically, the process comprises simultaneously filament winding a continuous ceramic fiber and vacuum forming a chopped ceramic fiber. The continuous ceramic fiber is wound onto a porous mandrel while a slurry of discontinuous fiber is pumped onto the mandrel. By applying both the continuous and discontinuous fiber simultaneously, the continuous ceramic fibers are well distributed throughout the filter.

Accordingly, one aspect of the present invention is drawn to a method for making a ceramic fiber composite filter having a distribution of continuous ceramic fiber and chopped ceramic fibers throughout a cross-section of the filter. A porous vacuum mandrel is provided and a vacuum is applied to the mandrel. A continuous ceramic fiber is filament wound onto the porous vacuum mandrel while simultaneously a dilute chopped ceramic fiber slurry is provided onto the porous vacuum mandrel and continuous ceramic fiber being filament wound thereon to produce a ceramic fiber composite filter preform having a distribution of the continuous ceramic fiber and chopped ceramic fibers within a cross-section of the preform. The ceramic composite filter preform is impregnated with a ceramic binder, any excess ceramic binder is removed, and the impregnated ceramic composite filter preform is dried. Finally, the ceramic composite filter preform is fired at a temperature of 870° C. to 1150° C. (1598° F.–2102° F.) to create a bond phase at the fiber contact points and produce the ceramic fiber composite filter.

A slurry of chopped or discontinuous alumina or aluminosilicate fiber is intermingled throughout the preform which is being reinforced by simultaneously filament winding a continuous ceramic fiber on a porous vacuum mandrel to produce a ceramic filter preform composite. The fibers are then bonded by impregnation with a chemical binder such as phosphoric acid or monoaluminum phosphate or a sol of an oxide of zirconia, silica, or alumina. The sol may be stabilized at fiber contact points by changing the pH level using liquid ammonium hydroxide or ammonia gas or other similar composition. The ceramic fiber composite filter preform is then dried and fired at a temperature of approximately 870° C. to 1150° C. (1598° F.–2102° F.) to create a bond phase at the fiber contact points and produce the ceramic fiber composite filter. If necessary, the sol-gel bonding procedure may be repeated to further strengthen the ceramic fiber composite filter preform.

Another aspect of the present invention is drawn to the article of manufacture of a ceramic fiber composite filter having a distribution of continuous ceramic fiber and chopped ceramic fibers throughout a cross-section of the filter, made by the above method.

In one embodiment, the continuous ceramic fiber is wound on the porous vacuum mandrel while a slurry of the chopped ceramic fiber is simultaneously deposited on the porous vacuum mandrel so that the continuous ceramic fiber is intimately surrounded by the discontinuous or chopped ceramic fibers. Alternatively, the porous vacuum mandrel may be partially immersed in the slurry of the chopped ceramic fiber while the continuous ceramic fiber is wound on the porous vacuum mandrel. The porous vacuum mandrel attracts the chopped ceramic fiber in the slurry to the continuous ceramic fiber as it rotates through the slurry, or as the slurry is pumped onto the porous vacuum mandrel.

The continuous ceramic fiber may be commercially available pure alumina fiber such as that made by Minnesota Mining and Manufacturing Company, a.k.a. 3M, and marketed as NEXTEL® 610, or Mitsui Mining Material Co., Ltd.'s ALMAX®(99.5% or more $Al_2O_3$), or aluminosilicate fibers such as 3M's NEXTEL® 720, 550, or 440. The chopped ceramic fiber is preferably a high alumina chopped fiber (e.g. Thermal Ceramics SAFFIL®-96% alumina, 4% silica), or another similar alumina or aluminosilicate fiber.

The resulting ceramic fiber composite filter of the present invention has improved strength, toughness and temperature resistance, retains an acceptable permeance, and is also lightweight and relatively simple to produce.

Yet another aspect of the present invention is drawn to the broader concept of a method for making a ceramic fiber composite structure having a distribution of continuous ceramic fiber and chopped ceramic fibers throughout a cross-section of the structure, comprising steps quite similar to those described above, as well as the article of manufacture of the ceramic fiber composite structure itself made by that method. The resulting ceramic fiber composite structure can be used to produce insulating panels or flat plate type sheets.

The various features of novelty which characterize the invention are pointed out with particularity in the claims annexed to and forming a part of this disclosure. For a better understanding of the invention, its operating advantages and specific benefits attained by its uses, reference is made to the accompanying figures and descriptive matter in which preferred embodiments of the invention are illustrated.

DESCRIPTION OF THE PREFERRED EMBODIMENTS

Figure 1:
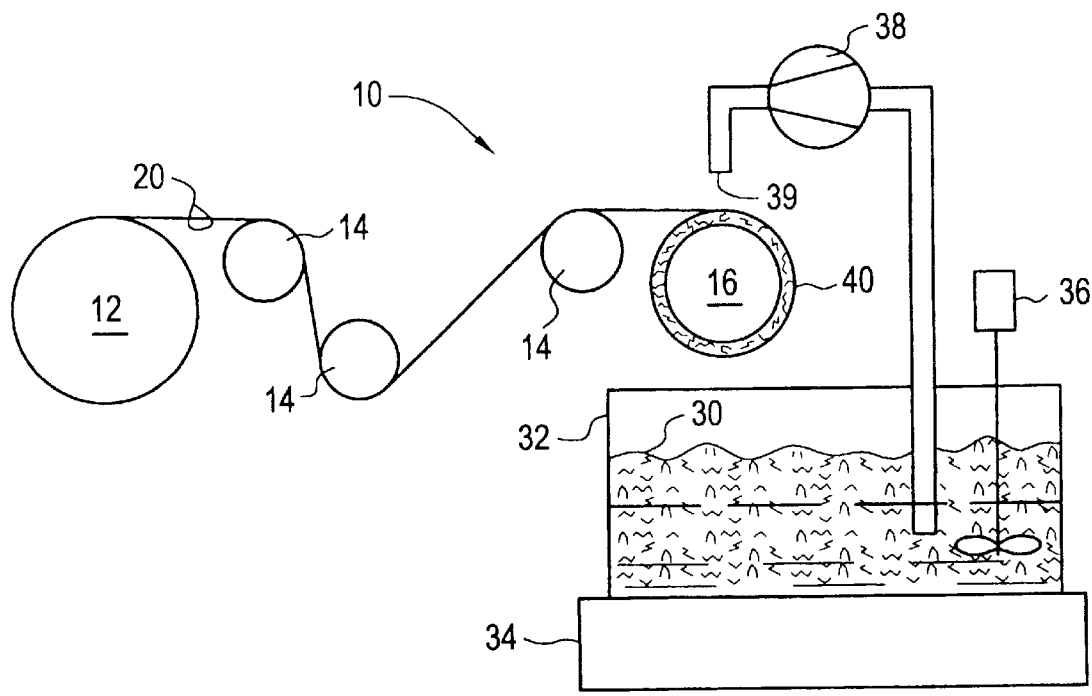
FIG. 1 is a schematic representation of a first apparatus for carrying out the method of making the filter of the invention.

Referring to the drawings generally, wherein like numerals represent the same or functionally similar elements throughout the several drawings, and to FIG. 1 in particular, there is shown an apparatus, generally designated 10, for making the hot gas cleanup ceramic fiber composite filter of the invention. The apparatus 10 has a continuous ceramic fiber supply spool 12 which provides a source of continuous ceramic fiber 20. Continuous ceramic fiber 20 passes over one or more tensioner rollers 14 before being taken up onto a porous vacuum mandrel 16.

In a first preferred embodiment, porous vacuum mandrel 16 is positioned over a tank 32 containing a slurry of discontinuous or chopped ceramic fiber 30. Mandrel 16 is rotated by hollow shaft 17 and drive means 18 (not shown in FIG. 1; see FIG. 4, infra) and is connected to a vacuum pump or source (this is also not shown in FIG. 1; see FIG. 4, infra) for creating/applying/providing a vacuum within the mandrel 16. To facilitate removal of the completed filter preform 40 from the mandrel, an underlayer of porous gauze or the like may be first placed onto the mandrel 16 prior to making the preform 40. Tank 32 sits on a weighing balance 34 and may be provided with a mixer 36 protruding into the chopped ceramic fiber slurry 30 to uniformly mix the chopped ceramic fibers within the slurry 30 contained within the tank 32.

Pump 38 pulls slurry 30 from the tank 32 and a nozzle 39 oriented adjacent to porous vacuum mandrel 16 ejects the slurry 30 onto the porous vacuum mandrel 16 and the continuous ceramic fiber 20 being filament wound thereon. As continuous ceramic fiber 20 is filament wound around the vacuum mandrel 16, the chopped ceramic fiber slurry 30 is deposited on the ceramic fiber 20 and the vacuum mandrel 16, creating a ceramic fiber composite filter preform 40. Excess slurry 30 returns to tank 32 for reuse. This embodiment is preferred over that of FIG. 2, infra, because it allows a more precise control of the amount of chopped ceramic fiber slurry 30 being deposited onto the porous vacuum mandrel 16.

Figure 2:
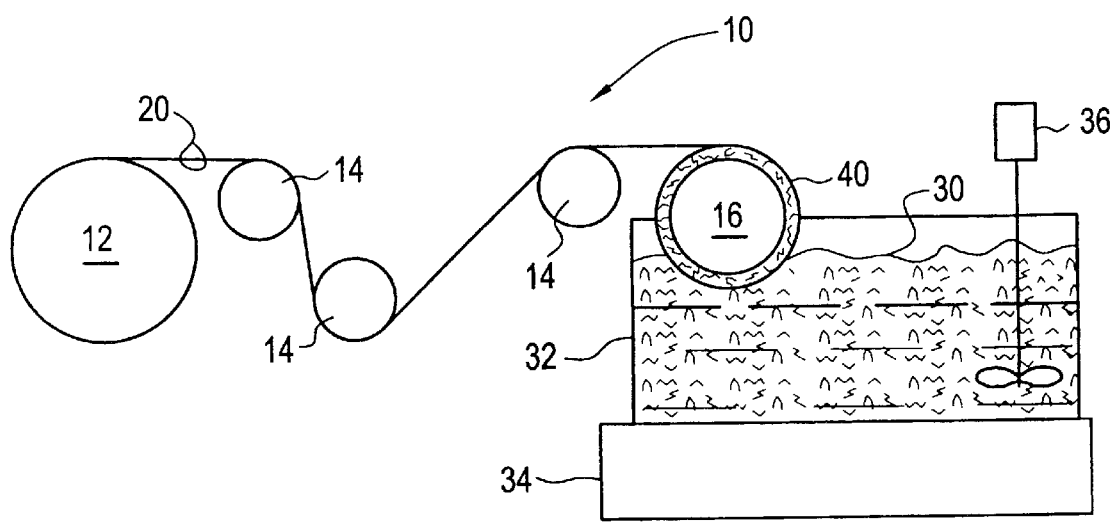
FIG. 2 is a schematic representation of an alternate apparatus for carrying out the method of making the filter of the invention.

In an alternate embodiment of the apparatus 10 shown in FIG. 2, the porous vacuum mandrel 16 may be partially immersed in the chopped ceramic fiber slurry 30 contained in tank 32. As indicated earlier, while this embodiment is not as preferred as that of FIG. 1, it eliminates the need for the pump 38, although a mixer 36 may still be used to maintain an even concentration of the chopped ceramic fibers throughout the slurry 30. The chopped ceramic fiber slurry 30 continuously and evenly coats all of the immersed portion of continuous ceramic fiber 20 being wound on porous vacuum mandrel 16.

Figure 3:
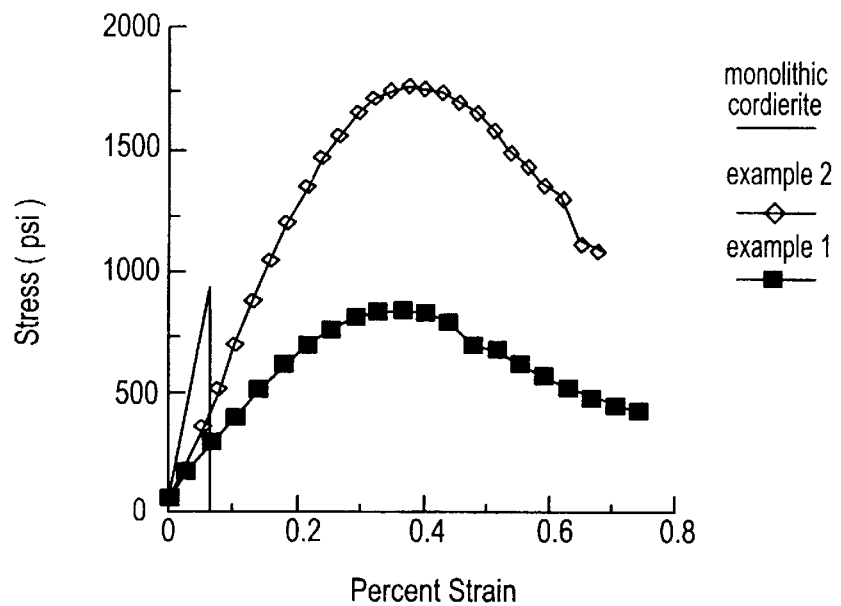
FIG. 3 is a graph plotting C-ring compressive strength results, in Stress in psi versus Percent Strain, for two sample filters made according to the invention and compared against one known type of filter.

FIG. 3 is a graph showing the results of a C-ring compressive strength test performed at room temperature on each of the filters formed according to the two examples below and a filter composed of monolithic Cordierite. Stress in psi is indicated along the ordinate (Y-axis) and percent strain (inch/inch) is shown on the abscissa (X-axis). From FIG. 3, it is immediately apparent that the ceramic fiber composite filters made according to the invention (Examples 1 and 2) do not display the brittle fracture type of failure that it typical of the prior art filter made of monolithic Cordierite. Instead, the filters made according to the invention display a much greater ability to absorb significant strain levels without failure. In the case of the filters made by Example 2, the stress which can be absorbed without fracture is also higher than that of a monolithic Cordierite filter.

Figure 4:
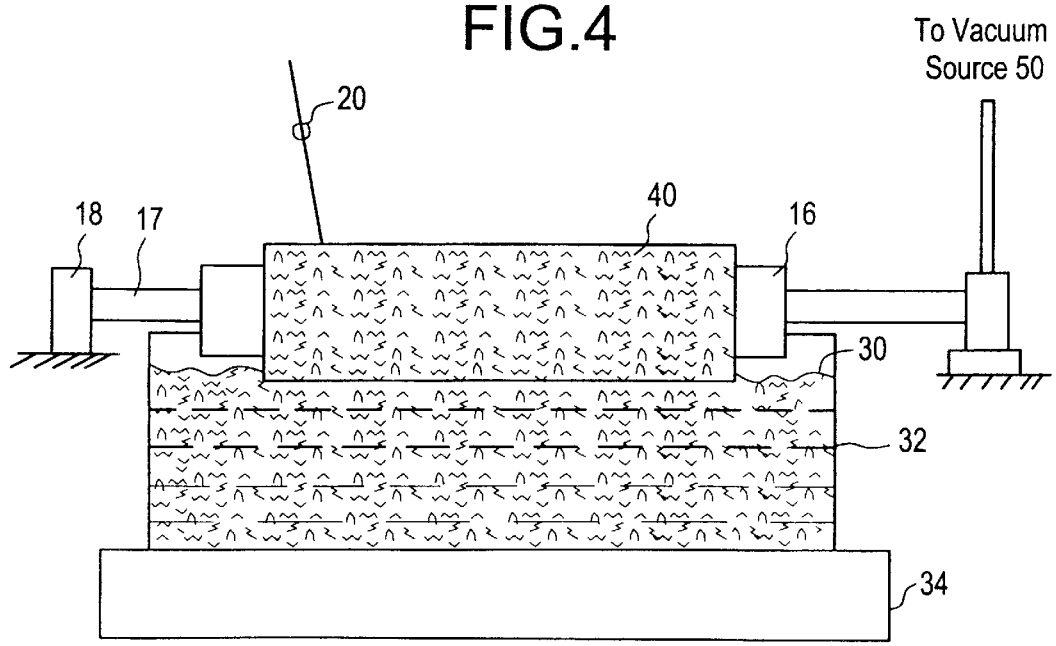
FIG. 4 is a schematic representation of a right side end elevation of FIG. 2.

FIG. 4 is a schematic representation of a right side end elevation view of FIG. 2, wherein the porous vacuum mandrel 16 is partially immersed in the chopped ceramic fiber slurry 30. A source of vacuum 50, such as a vacuum pump, is connected to hollow shaft 17 which rotates the porous vacuum mandrel 16 via drive means 18. The vacuum source or pump 50 creates a vacuum within the porous vacuum mandrel 16 which attracts the chopped ceramic fiber slurry 30 to the mandrel 16. The composite ceramic filter preform 40 is thereby created by the intimate intermingling of the chopped ceramic fiber slurry 30 and continuous ceramic fiber 20 around the porous vacuum mandrel 16. It is understood that the particular application of vacuum to the porous vacuum mandrel shown in FIG. 4 is also the approach used in connection with the apparatus and method of FIG. 1.

Once a sufficient thickness of the ceramic fiber composite filter preform 40 has been created on vacuum mandrel 16, the ceramic fiber composite filter preform 40 is impregnated with an oxide of zirconia, silica, or alumina in sol form. Excess sol is removed by the vacuum system with the remaining sol located primarily at the fiber contact points. The preform may then be dried and fired in air to a temperature of approximately 1100° C. (2012° F.) to sinter the bond phase and thereby solidify the ceramic fiber composite filter preform 40 for use.

Alternatively, the impregnated preform 40 may be stabilized to create a gel state at the fiber contact points by changing the pH level of the sol using either ammonium hydroxide or ammonia gas. The gelled ceramic fiber composite filter preform 40 is then dried and fired in air to a temperature of approximately 1100° C. (2012° F.) to convert the gel to a bond phase at the fiber contact points and thereby solidify the ceramic fiber composite filter preform 40 for use.

Materials used for the continuous ceramic fiber 20 include pure alumina fiber such as NEXTEL® 610, or ALMAX® or other alumina fibers. The specific continuous fiber 20 used depends on the application environment and temperature. The mechanical durability of the composite ceramic filter preform 40 could be further improved by first coating the continuous ceramic fiber 20 with a non-reactive coating such as carbon, boron nitride, or other oxide materials. The coating prevents the continuous fiber 20 from reacting with the phosphoric acid or acid stabilized oxide sol binder, and only the discontinuous chopped ceramic fiber 30 surrounding the continuous ceramic fiber 20 is bonded.

The chopped ceramic fiber slurry 30 may be comprised of a high alumina fiber such as SAFFIL®, or another alumina or aluminosilicate fiber. The length of the chopped ceramic fibers may be varied, but should be kept relatively short. The concentration of chopped ceramic fiber may be controlled by varying the speed at which mandrel 16 takes up continuous ceramic fiber 20, or by changing the concentration of chopped ceramic fibers in the slurry 30. The slurry itself is made by adding an amount of demineralized water to the chopped ceramic fibers sufficient to produce a dilute (approximately 0.1% by wt. fibers to water) slurry.

For greater clarity, two examples of the construction of a ceramic fiber composite filter 40 according to the invention are provided and described below.

EXAMPLE 1

A ceramic fiber composite filter of the invention was formed using the vacuum winding apparatus of FIG. 1. The ceramic fiber composite filter was fabricated by winding ALMAX® 1000 filament 250 grams/1000 meters yarn (trade designation of an alumina fiber, available from Mitsui Mining Company) around a porous vacuum mandrel while simultaneously directing a stream of a 0.1 weight percent SAFFIL® fiber (trade designation of a chopped alumina fiber available from Thermal Ceramics) slurry onto the preform. The ratio of continuous ceramic fiber (ALMAX®) to chopped ceramic fiber (SAFFIL®) was 1:1. The continuous fiber was wound at a 45 degree angle to the axis of the preform with a spacing 0.074 inches and a winding tension of 100 grams. The chopped fiber was mixed in a high shear mixer to reduce the fiber length to 0.05 to 1 mm. A vacuum of 12 to 18 inches of mercury was applied to the porous mandrel throughout the filament winding operation.

The resulting ceramic fiber composite filter preform was impregnated with a boehmite sol. Then, the ceramic fiber composite filter preform was dried and fired to 593° C. (1100° F.) for 2 hours in air. The preform was then removed from the mandrel and fired at 1150° C. (2102° F.) in air for two hours.

A cross-section cut from the finished ceramic fiber composite filter demonstrated that the continuous ceramic fiber was uniformly distributed throughout the discontinuous fibers. The ceramic fiber composite filter exhibited an average compressive C-ring strength of 825 psi with a non-brittle failure. The ceramic fiber composite filter element exhibited a pressure drop of 6 inches of water at a face velocity of 10 ft/min. The face velocity was obtained by dividing the flow rate per minute (in ft$^3$/min) by the unit area (in ft$^2$) of the filter element.

EXAMPLE 2

A ceramic fiber composite filter of the invention was formed using the vacuum winding apparatus of FIG. 1. The ceramic fiber composite filter was fabricated by winding carbon coated NEXTEL® 610 1500 denier alumina fiber (trade designation of an alumina fiber available from 3M Company) around a porous vacuum mandrel while simultaneously directing a stream of a 0.1 weight percent SAFFIL® fiber (trade designation of a chopped alumina fiber available from Thermal Ceramics) slurry on to the preform. The ratio of continuous ceramic fiber (NEXTEL® 610) to chopped fiber (SAFFIL™) was 2:1. The continuous fiber was wound at a 45 degree angle to the axis of the preform with a spacing 0.074 inches and a winding tension of 100 grams. The chopped fiber was mixed in a high shear mixer to reduce the fiber length to 0.05 to 1 mm. A vacuum of 12 to 18 inches of mercury was applied to the porous mandrel throughout the filament winding process.

The resulting ceramic fiber composite filter preform was saturated with phosphoric acid. Excess phosphoric acid was removed under vacuum. This step was repeated three times to minimize the dilution of the phosphoric acid bond system. Then, the ceramic fiber composite filter preform was dried and fired to 525° C. (977° F.) for 2 hours in a nitrogen atmosphere. After removing the mandrel, the preform was fired to 871° C. (1600° F.) for two hours in nitrogen. A third heat treatment to 871° C. (1600° F.) for 2 hours was performed in air to complete the process.

A cross-section cut from the finished ceramic fiber composite filter demonstrated that the continuous ceramic fiber was uniformly distributed throughout the discontinuous SAFFIL fibers. The ceramic fiber composite filter exhibited an average compressive C-ring strength of 1752 psi with a non-brittle failure. This ceramic fiber composite filter element exhibited a pressure drop of 12 inches of water at a face velocity of 10 ft/min. The face velocity was obtained by dividing the flow rate per minute (in ft$^3$/min) by the unit area (in ft$^2$) of the filter element.

The filter of the invention shows improved strength and toughness. Additionally, the low density makes it lightweight in comparison to other known filters. The relative amounts of continuous and discontinuous chopped ceramic fibers are easily controlled by varying the rotation speed of the porous vacuum mandrel, and/or by changing the concentration of the chopped ceramic fibers in the slurry. The tension on the continuous ceramic fiber can be varied to affect the tightness, and therefore the density, of the resulting preform. The continuous ceramic fiber spacing can also be varied to control the amount and distribution of these fibers. The simple process allows for optimized utilization of the continuous fiber by varying the relative proportion of continuous and discontinuous ceramic fibers throughout the wall thickness of the ceramic fiber composite filter. This allows for many different filter structural compositions made according to the invention to be formed easily and economically. For example, since the continuous fiber is quite costly, the method according to the present invention can be used to preferentially distribute more of the continuous ceramic fiber at certain locations, and less of the continuous fiber at other locations. These locations might be selected based upon the expected stress levels which the ceramic fiber composite filter would experience during service. As applied to a cylindrical cross-section filter, this could mean providing greater amounts of continuous ceramic fiber at or near the inside and outside wall surfaces, and less near the center of the wall thickness. Similarly, the variation could be done along an axial length of a filter, alone or in combination with the above-described through-wall variation.

In addition, while the actual structure of the material which makes the ceramic fiber composite is a ceramic, the structure is quite (approximately 70%) porous which provides for the possibility that this structure can be used in other applications. For example, the cylindrical shaped ceramic fiber composite could be used instead as a thermal insulator. By making the ceramic fiber composite on a mandrel of a suitable size, the resultant ceramic fiber composite could be slid over the outside diameter of a tube or pipe to provide an insulating layer thereon. If the piping is already in place and would not allow the sliding of such a structure onto the tube or pipe from one end thereof, it would be a relatively simple matter to longitudinally slit the ceramic fiber composite structure to create one or more pieces which could be placed on the outside diameter of the tube or pipe and then mechanically or otherwise affixed in place. To allow for the possibility that some material might be lost during the longitudinal slitting procedure mentioned, the mandrel could be made somewhat larger in diameter to compensate.

Figure 5:
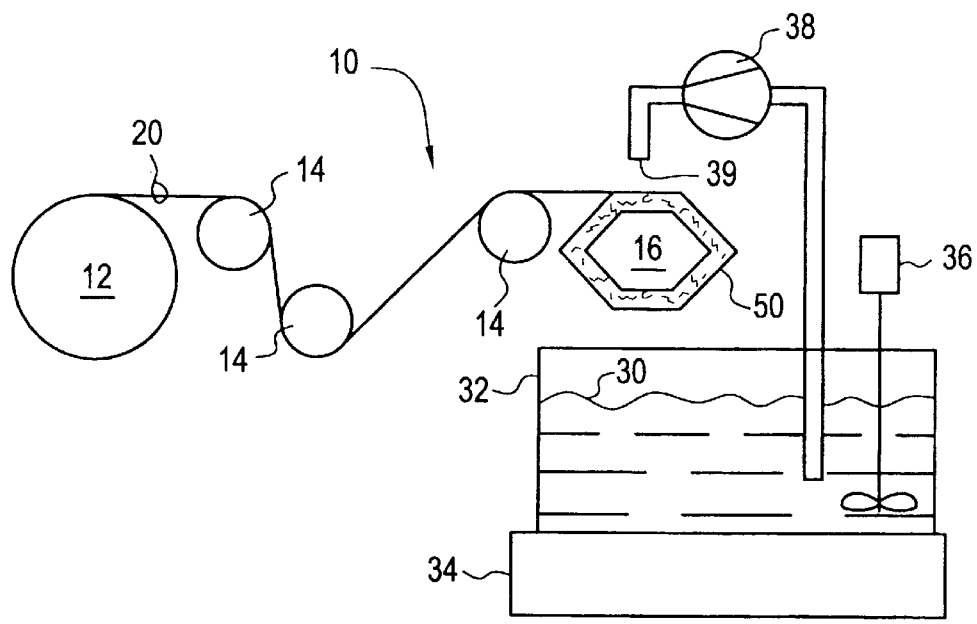
FIG. 5 is a schematic representation of an apparatus, similar to that shown in FIG. 1, wherein the method of the present invention can be used to produce a polygonal ceramic fiber composite structure which can then be cut into longitudinal segments useful as insulating panels.
Figure 6:
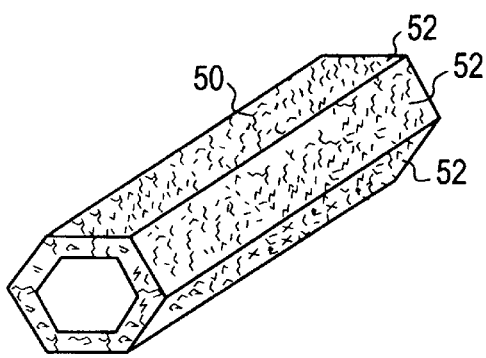
FIG. 6 is a perspective schematic representation of a polygonal ceramic fiber composite structure made according to the method of the present invention, removed from the porous mandrel but prior to being cut into longitudinal segments.
Figure 7:
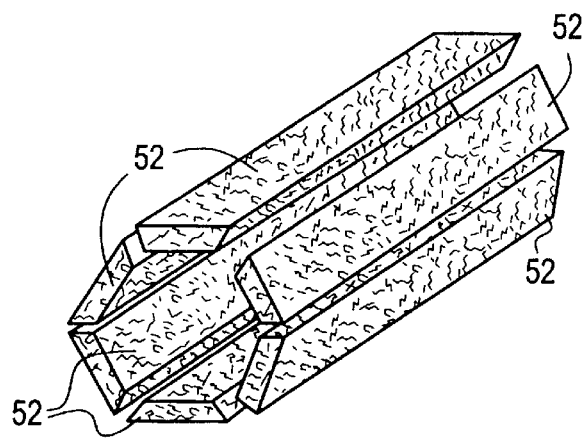
FIG. 7 is a perspective schematic representation of the polygonal ceramic fiber composite structure of FIG. 6 after it has been cut into longitudinal segments.

Additionally, since the ceramic fiber composite structure made according to the invention has insulating properties, it may be desirable to produce flat sheets or the like for placement on a flat wall surface as an insulating panel, and these aspects are shown in FIGS. 5–7. As shown in FIG. 5, instead of using a cylindrical mandrel, the mandrel may be provided with a multi-sided or polygonal outside surface. To minimize possible undesirable effects that might occur at the corners of such a mandrel, it might be preferred to provide for at least a hexagonal or greater number of sides on the mandrel to maximize the number of corners and thereby minimize the degree to which the continuous ceramic fibers would be bent at such corners. However, if these "corner effects" are not objectionable, lesser-sided polygon shapes may be used, including triangular, square, rectangular, pentagonal, etc. Further, the polygons need not be regular (i.e., all sides equal), and in fact the mandrel might be provided with a shape which is a combination of curved and straight sides. For example, a rectangular-shaped porous vacuum mandrel, perhaps provided with rounded corners or ends, could also be used to facilitate production of such flat plate type sheets.

FIG. 5 illustrates a hexagonal porous mandrel used to make a hexagonal composite structure or preform 50. The flat plate type sheets would be made from individual sides or segments 52 of the ceramic fiber composite structure, being cut therefrom upon completion of the firing steps. The width and length of such segments 52 would be determined by the size of the mandrel on which the polygonal ceramic fiber composite structure 50 is produced.

While specific embodiments of the invention have been shown and described in detail to illustrate the application of the principles of the invention, it will be understood that the invention may be embodied otherwise without departing from such principles.

We claim:

1. A method for making a ceramic fiber composite filter having a distribution of continuous ceramic fiber and chopped ceramic fibers throughout a wall thickness of the filter, comprising the steps of:

providing a porous vacuum mandrel and applying a vacuum thereto;

filament winding a continuous ceramic fiber onto the porous vacuum mandrel while simultaneously providing a dilute chopped ceramic fiber slurry onto the porous vacuum mandrel and continuous ceramic fiber being filament wound thereon so that the continuous ceramic fiber is intimately surrounded by the chopped ceramic fibers, and varying the relative proportions of the continuous fiber and chopped ceramic fibers to produce a ceramic fiber composite filter preform having a distribution of the continuous ceramic fiber and chopped ceramic fibers throughout a wall thickness of the preform;

impregnating the ceramic composite filter preform with a ceramic binder, removing any excess ceramic binder, and drying the impregnated ceramic composite filter preform; and firing the ceramic composite filter preform at a temperature of 870° C. to 1150° C. (1598° F.–2102° F.) to create a bond phase at the fiber contact points and produce the ceramic fiber composite filter.

2. The method according to claim 1, wherein the step of simultaneously providing the dilute chopped ceramic fiber slurry onto the porous vacuum mandrel comprises the step of directing a stream of dilute chopped ceramic fiber slurry onto the porous vacuum mandrel while the continuous ceramic fiber is being filament wound thereon.

3. The method according to claim 1, wherein the step of simultaneously providing the dilute chopped ceramic fiber slurry onto the porous vacuum mandrel comprises the step of partially immersing the porous vacuum mandrel into a tank containing the dilute chopped ceramic fiber slurry while the continuous ceramic fiber is being filament wound on the porous vacuum mandrel.

4. The method according to claim 1, wherein the continuous ceramic fiber comprises one of an alumina and aluminosilicate ceramic fibers.

5. The method according to claim 1, wherein the chopped ceramic fiber in the dilute chopped ceramic fiber slurry comprises one of an alumina and aluminosilicate ceramic fibers.

6. The method according to claim 1, wherein the ceramic binder comprises a sol of an oxide of one of zirconia, alumina and silica.

7. The method according to claim 6, further comprising the step of using ammonium hydroxide to change the pH of the sol and the ceramic composite filter preform.

8. The method according to claim 1, further comprising the step of coating the continuous ceramic fiber with a carbonaceous coating which is not reactive with the ceramic binder, prior to impregnating the ceramic composite filter preform with the ceramic binder.

9. The method according to claim 8, wherein the ceramic binder comprises one of monoaluminum phosphate and phosphoric acid.

10. The method according to claim 1, comprising the step of firing the ceramic composite filter preform in a nitrogen atmosphere.

11. The method according to claim 1, comprising the step of varying the rotation speed of the porous vacuum mandrel to control the relative amounts of continuous and chopped ceramic fibers in the ceramic fiber composite filter.

12. The method according to claim 1, comprising the step of changing the concentration of the chopped ceramic fibers in the dilute slurry to control the relative amounts of continuous and chopped ceramic fibers in the ceramic fiber composite filter.

13. The method according to claim 1, comprising the step of varying the tension of the continuous ceramic fiber being filament wound on the porous vacuum mandrel to affect the tightness and density of the ceramic fiber composite filter.

14. The method according to claim 1, comprising the step of varying the spacing of the continuous ceramic fiber being filament wound on the porous vacuum mandrel to control the relative amounts of continuous and chopped ceramic fibers in the ceramic fiber composite filter.

15. The method according to claim 1, comprising the step of varying the relative proportions of the continuous ceramic fiber and chopped ceramic fibers throughout the ceramic fiber composite filter to preferentially distribute more or less of the continuous ceramic fiber at certain locations.

16. The method according to claim 1, comprising the step of varying the relative proportions of the continuous ceramic fiber and chopped ceramic fibers along an axial length of the ceramic fiber composite filter.

17. A method for making a ceramic fiber composite structure having a distribution of continuous ceramic fiber and chopped ceramic fibers throughout a cross-section of the structure, comprising the steps of:

providing a porous vacuum mandrel and applying a vacuum thereto;

filament winding a continuous ceramic fiber onto the porous vacuum mandrel while simultaneously providing a dilute chopped ceramic fiber slurry onto the porous vacuum mandrel and continuous ceramic fiber being filament wound thereon so that the continuous ceramic fiber is intimately surrounded by the chopped ceramic fibers, and varying the relative proportions of the continuous fiber and chopped ceramic fibers to produce a ceramic fiber composite preform having a distribution of the continuous ceramic fiber and chopped ceramic fibers throughout a cross-section of the preform;

impregnating the ceramic fiber composite preform with a ceramic binder, removing any excess ceramic binder, and drying the impregnated ceramic fiber composite preform; and firing the impregnated ceramic fiber composite preform at a temperature of 870° C. to 1150° C. (1598° F.–2102° F.) to create a bond phase at the fiber contact points and produce the ceramic fiber composite structure.

18. The method according to claim 17, wherein the step of simultaneously providing the dilute chopped ceramic fiber slurry onto the porous vacuum mandrel comprises the step of directing a stream of dilute chopped ceramic fiber slurry onto the porous vacuum mandrel while the continuous ceramic fiber is being filament wound thereon.

19. The method according to claim 17, wherein the step of simultaneously providing the dilute chopped ceramic fiber slurry onto the porous vacuum mandrel comprises the step of partially immersing the porous vacuum mandrel into a tank containing the dilute chopped ceramic fiber slurry while the continuous ceramic fiber is being filament wound on the porous vacuum mandrel.

20. The method according to claim 17, wherein the continuous ceramic fiber comprises one of an alumina and aluminosilicate ceramic fibers.

21. The method according to claim 17, wherein the chopped ceramic fiber in the dilute chopped ceramic fiber slurry comprises one of an alumina and aluminosilicate ceramic fibers.

22. The method according to claim 17, wherein the binder comprises a sol of an oxide of one of zirconia, alumina and silica.

23. The method according to claim 22, further comprising the step of using ammonium hydroxide to change the pH of the sol and the ceramic fiber composite preform.

24. The method according to claim 17, further comprising the step of coating the continuous ceramic fiber with a carbonaceous coating which is not reactive with the ceramic binder, prior to impregnating the ceramic composite filter preform with the ceramic binder.

25. The method according to claim 24, wherein the ceramic binder comprises one of monoaluminum phosphate and phosphoric acid.

26. The method according to claim 17, comprising the step of firing the ceramic fiber composite preform in a nitrogen atmosphere.

27. The method according to claim 17, comprising the step of varying the rotation speed of the porous vacuum mandrel to control the relative amounts of continuous and chopped ceramic fibers in the composite ceramic structure.

28. The method according to claim 17, comprising the step of changing the concentration of the chopped ceramic fibers in the dilute slurry to control the relative amounts of continuous and chopped ceramic fibers in the composite ceramic structure.

29. The method according to claim 17, comprising the step of varying the tension of the continuous ceramic fiber being filament wound on the porous vacuum mandrel to affect the tightness and density of the composite ceramic structure.

30. The method according to claim 17, comprising the step of varying the spacing of the continuous ceramic fiber being filament wound on the porous vacuum mandrel to control the relative amounts of continuous and chopped ceramic fibers in the composite ceramic structure.

31. The method according to claim 17, comprising the step of varying the relative proportions of the continuous ceramic fiber and chopped ceramic fibers throughout the ceramic composite structure to preferentially distribute more or less of the continuous ceramic fiber at certain locations.

32. The method according to claim 17, comprising the step of varying the relative proportions of the continuous ceramic fiber and chopped ceramic fibers throughout a wall thickness of the ceramic composite structure.

33. The method according to claim 17, comprising the step of varying the relative proportions of the continuous ceramic fiber and chopped ceramic fibers along an axial length of the ceramic composite structure.

34. The method according to claim 17, comprising the step of cutting the ceramic fiber composite structure into one or more pieces.

35. The method according to claim 17, comprising the step of providing a porous vacuum mandrel having a polygonal outside shape to produce a polygonal-shaped ceramic composite structure.

36. The method according to claim 35, comprising the step of cutting the polygonal-shaped ceramic composite structure so produced into a plurality of sheets.

* * * * *